Figure 1:
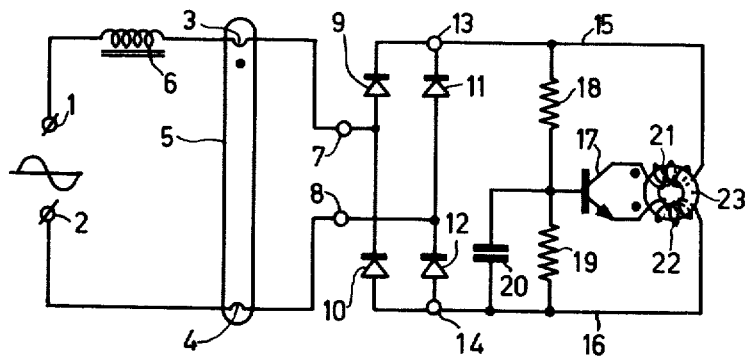

United States Patent [19]

Remery

[11] 3,890,539
[45] June 17, 1975

[54] IGNITION OF DISCHARGE TUBES
[75] Inventor: Michel Remery, Evreux, France
[73] Assignee: U.S. Philips Corporation, New York, N.Y.
[22] Filed: Dec. 6, 1973
[21] Appl. No.: 422,588

[30] Foreign Application Priority Data
Dec. 15, 1972 France .............................. 72.44734
Feb. 26, 1973 France .............................. 73.06689

[52] U.S. Cl. ...... 315/273; 315/DIG. 2; 315/DIG. 7; 315/283
[51] Int. Cl. ............................................ H05b 41/16
[58] Field of Search.......... 315/DIG. 5, DIG. 7, 101, 315/105, 283; 331/112

[56] References Cited
UNITED STATES PATENTS
3,018,419  1/1962  Bohn.................................. 331/112
3,440,564  4/1969  Kuiper............................... 331/112
3,448,335  6/1969  Gregory et al...................... 331/112
3,467,887  9/1969  Skirvin............................... 331/112
3,700,956  10/1972  Cluett................................ 331/112

FOREIGN PATENTS OR APPLICATIONS
1,100,329  1/1968  United Kingdom................. 331/112

Primary Examiner—Michael J. Lynch
Assistant Examiner—B. P. Davis
Attorney, Agent, or Firm—Frank R. Trifari; Bernard Franzblau

[57] ABSTRACT

An electronic arrangement for the ignition of a gas and/or vapour discharge tube.

An oscillator having a frequency of approximately 25 kHz produces peak voltages between the electrodes of said tube, which voltages cause the tube to be ignited. Use in the field of ignition of discharge tubes provided or not provided with preheated electrodes.

11 Claims, 3 Drawing Figures

IGNITION OF DISCHARGE TUBES

The invention relates to an arrangement for the ignition of a gas and/or vapour discharge tube which is provided with at least two electrodes, which arrangement has two input terminals intended to be connected to an alternating voltage source, which input terminals are connected in the operating condition of the discharge tube by means of a series arrangement of at least an inductor and the discharge tube, an auxiliary branch of the arrangement electrically connecting the tube electrodes for a short period during the ignition procedure, said auxiliary branch being provided with a rectifier member whose output section is connected to two electrical supply conductors which serve to supply a transistor circuit associated with the arrangement, the said short-lasting electrical connection being established through said transistor.

The said inductor is formed, for example, as a choke or is combined with a transformer to form a leakage transformer.

The lifetime of a discharge tube, for example, a low-pressure mercury vapour discharge tube is determined inter alia by the number of ignitions to which the tube is subjected. As regards ignition it is known from experience that the number of ignitions to which the tube can be subjected is approximately inversely proportional to the average period elapsing between the application of a voltage to the tube and its actual ignition. It might be assumed that this is due to the fact that the emitter generally coating the tube electrodes and intended for reducing the work potential of these electrodes is subjected to a strong ion bombardment during the ignition phase. The shortest possible ignition time is thus a very important factor for enhancing the lifetime of tubes which must be switched very often.

One of the means to reduce the period of ignition is the application of the largest possible potential difference between the tube electrodes during the ignition phase.

According to a prior proposal by the invention (French Patent Application No. 7,216,521) describing an arrangement of the kind mentioned in the preamble the current through the inductor (stabilisation inductor) is interrupted a large number of times per period of the alternating voltage source during the ignition procedure. The repetitive peak voltages thus generated resulting from these current interruptions enhance a quick ignition of the discharge tube. In an arrangement according to said prior proposal peak voltages in the order of 700 volts can be obtained with a supply voltage of 220 volts. This led to an ignition time of from 0.3 second to 0.5 second.

It was found that the ignition time can be considerably reduced by increasing the ignition voltage which may even render preheating of the electrodes superfluous and thus permits of using tubes whose electrodes need not be preheated.

It is therefore an object of the invention to provide an arrangement of the kind described in the preamble in which discharge tubes are ignited within a very short time while it is unimportant whether or not the tubes are provided with preheated electrodes.

According to the invention an arrangement for the ignition of a gas and/or vapour discharge tube which is provided with at least two electrodes, which arrangement has two input terminals intended to be connected to an alternating voltage source and in which said input terminals are connected in the operating condition of the discharge tube by means of a series arrangement of at least an inductor and the discharge tube and in which an auxiliary branch of the arrangement electrically connects the tube electrodes together for a short time during the ignition procedure, while the auxiliary branch is provided with a rectifier member whose output section is connected to two electrical supply conductors which serve to supply a transistor circuit associated with the arrangement, which short-lasting electrical connection is established through this transistor, is characterized in that the transistor circuit is provided with a transformer a first winding of which is arranged between the collector of the transistor and one of the two supply conductors, and a second winding of the transformer is either arranged between the emitter of the transistor and the second supply conductor or between the base of the transistor and said second supply conductor.

An advantage of this arrangement is the quick ignition of the lamp.

In a preferred embodiment of an arrangement according to the invention the magnetic circuit of the transformer consists of a ferrite ring. An advantage thereof is that the transformer may be very simple.

In the case where the second winding of the transformer is arranged between the base of the transistor and the second supply conductor this second winding is preferably connected through a capacitor, or through a resistor, to the second supply conductor. An advantage thereof is that the control of the transistor can be governed even better.

In an arrangment according to the invention periodic current interruptions having very short time intervals are realized in the inductor (inductive stabilisation ballast) which give rise to voltages in the order of 1,000 volts between the electrodes of the tube. A low-pressure mercury vapour discharge lamp then ignites after approximately 0.2 second. Consequently, the maximum number of times that the tube can be ignited is increased considerably on the one hand while on the other hand it is possible to provide the tube with electrodes of the non-preheated type.

In addition a starting auxiliary branch of the arrangement according to the invention may be formed from a small number of circuit components so that this arrangement may be very compact and consequently this starting auxiliary branch and the conventional bimetal starter are exchangeable.

Figure 2:
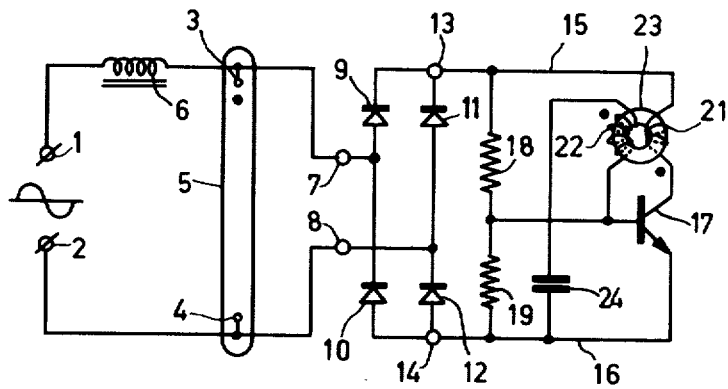
Figure 3:
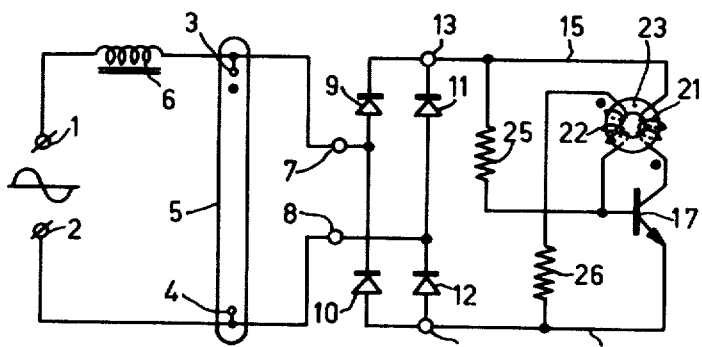

The invention will be described with reference to the accompanying drawing in which:

FIG. 1 shows an arrangement according to the invention and a lamp to be ignited with this arrangement; and FIGS. 2 and 3 show two other arrangements according to the invention and also the lamps to be ignited with these arrangements.

The FIGS. 1, 2 and 3 relate to the ignition of low-pressure mercury vapour discharge lamps. These lamps are generally provided with a fluorescence coating.

In FIG. 1 an input terminal 1 and an input terminal 2 are shown which are intended to be connected to an AC supply of approximately 200 V, 50 Hz. Terminal 1 is connected through an inductive stabilisation ballast 6 to one end of an electrode 3, of the pre-heated type, of a low-pressure mercury vapour discharge tube 5, while terminal 2 is directly connected to one end of the pre-heated electrode 4 of this tube 5.

The other ends of the electrodes 3 and 4 are connected to the connecting terminals 7 and 8, respectively, each constituting a common anode-cathode point of two groups of diodes 9–10 and 11–12 together constituting a rectifier bridge.

The output terminal 13 of the diode bridge is connected to the (positive) supply conductor 15 while the output terminal 14 of said bridge is connected to the (negative) supply conductor 16.

The base of an npn-transistor 17 is connected to a junction of two resistors 18 and 19 together constituting a potential divider provided between the conductors 15 and 16, while in addition a capacitor 20 is arranged in parallel with the resistor 19.

The collector of the transistor 17 is connected to the conductor 15 through a first winding 21 while the emitter of this transistor 17 is connected to the conductor 16 through a second winding 22. The windings 21 and 22 are provided on a ferrite ring 23.

In FIG. 2, in which the reference numerals correspond to those of FIG. 1 the electrodes 3 and 4 are of the non-preheated type. One end of the second winding 22, on the ferrite ring 23, is connected to the base of the transistor 17, while the other end of said winding 22 is coupled to the negative supply conductor 16 through a capacitor 24. On the other hand the emitter of transistor 17 is directly connected to this conductor 16.

In FIG. 3 whose reference numerals correspond to those of FIGS. 1 and 2 the base of transistor 17 is connected to the positive conductor 15 through a resistor 25, and to one end of the winding 22 on the ferrite ring 23. The other end of said winding 22 is connected through a resistor 26 to the negative conductor 16. In addition the emitter of the said transistor 17 is connected to the conductor 16.

The circuits shown in FIGS. 1, 2 and 3 are among the "blocking oscillators."

It is known that a very short switching time can be realised through a cumulative effect in such an oscillator with a strong magnetic coupling between the collector and the emitter or between the collector and the base. This applies for the switching times between the non-conducting state and the saturation state of the transistor 17. As regards the circuits of FIGS. 1 and 2 these circuits can also operate in a non-stable manner due to the presence of the capacitors 20 and 24 while in addition, these capacitors shorten the transistion time between the conducting state and the cut-off state, and conversely.

The circuit arrangement of FIG. 3, which does not include a capacitor, is of the monostable type and in principle it cannot change from the cut-off condition to the conducting condition in the absence of a control pulse. However, it is found that due to the pulsatory direct current supply through the diode bridge the required circumstances are obtained under which the circuit arrangement can oscillate.

The repetition frequency of these circuit arrangements, which is predominantly determined by the inductance of the collector winding 21, is approximately 25 kHz, which directly after switching on the arrangement results in a series of current interruptions and current short-circuits at this frequency between the terminals 13 and 14 for a period of the pulsatory direct voltage supplied through the diode bridge. This gives rise to corresponding interruptions of the current flowing in the ballast 6 while as a result of the very high $dI/dt$ ratio which is due to the high switching speed the said interruptions cause voltages between the electrodes 3 and 4 in the order of 1000 volts at a supply voltage of 220 volts and the use of an inductive ballast which results in a substantially immediate ignition of the tube 5.

As regards particularly the circuits of FIGS. 1 and 2, the ratio $dI/dt$ is substantially limited by the switching time of the diode groups 9–10 and 11–12 of the rectifier bridge. It is therefore necessary to use diodes which have a sufficiently short recovery time in order to be able to use the large switching speed of the blocking oscillator advantageously.

After ignition of the tube 5 the voltage at the terminals 7 and 8 is reduced by more than 50 percent of its previous value, and the interruption of the current is finished because the resistive value of the resistance bridge to which the base of transistor 17 is connected is adjusted in such a manner that the circuit is prevented from oscillating at this reduced voltage (between the terminals 7 and 8).

With the aid of the arrangements according to FIGS. 1 and 2 the ignition takes place on average 0.2 second after switching on the arrangement. As regards the circuit arrangement according to FIG. 3 ignition of the tube is effected between 0.3 and 0.4 second after switching on the arrangement. Under these circumstances preheating may be considered to be superfluous because the temperature of the electrodes not be only increased very much within such a short time. It is also to be taken into account that the current feeding the electrode is interrupted numerous times by the transistor.

This assumption was confirmed by an experiment in which the electrodes 3 and 4 of the tube 5 (FIG. 1) were short-circuited. The ignition of the tube was effected as quickly as before this short circuit, which means that also low-pressure mercury vapour discharge lamps including electrodes of the non-preheated type (FIG. 2 and FIG. 3) could be used.

If for some reason or other the tube is not ignited, which may occur, for example, due to a defect in the tube 5, the starter operates continuously and is then a source of intensive radio interference and also involves the risk of damage to the ballast (6) due to abnormal heating. In a manner not shown in the Figures this condition can be prevented by replacing the resistors 19 in FIGS. 1 and 2 and the resistor 26 in FIG. 3 by resistors having a negative temperature coefficient or by replacing the resistor 18 (FIGS. 1 and 2) and the resistor 25 (FIG. 3) by resistors having a positive temperature coefficient. In the case where the ignition is not effected the total pulsatory direct voltage can be applied in this manner without any interruption to the said resistors, while the emanating heating of these temperature-sensitive resistors gradually changes the resistance ratio of the resistance bridge in a manner such that the voltage at the base of the transistor 17 is reduced and the current is interrupted, for example, after approximately 10 seconds. Such a step is known, for example, from an application of addition (No. EN 7,243,394) to the French Patent application stated hereinbefore.

It is to be noted for the purpose of explanation that the arrangement according to the invention was realised by means of circuit elements whose electrical data etc. are given below:

| | |
|---|---|
| — Diodes 9-10-11-12 | BYX 10 |
| — Transistor 17 | BU 105 |
| — Resistor 18 | 100 KΩ |
| — Resistor 19 | 1 KΩ |
| — Capacitors 20-24 | 10 nF |
| — Resistor 25 | 56 KΩ |
| — Resistor 26 | 100 Ω |
| — Winding 21 | 20 turns |
| — Winding 22 | 6 turns |
| — Ferrite ring | 14×9×5 mm 3E2. |

What is claimed is:

1. A control circuit for an electric discharge tube provided with at least two electrodes comprising, a pair of input terminals for applying an AC supply voltage to said control circuit, an inductor, means connecting the series arrangement of the inductor and the discharge tube across said input terminals, an auxiliary branch circuit for connecting the tube electrodes electrically together for a short time during the ignition procedure and including a rectifier member having input terminals connected to the tube electrodes and an output section connected to two electrical supply conductors which serve to supply a transistor circuit for establishing said short-lasting electrical connection, the transistor circuit comprising a transformer having a first winding which is connected between the collector of the transistor and one of the two supply conductors and a second winding connected between said second supply conductor and a second electrode of the transistor, and means connecting the third transistor electrode to the second supply conductor.

2. A control circuit as claimed in claim 1, characterized in that the rectifier member comprises a diode bridge.

3. A control circuit as claimed in claim 1, wherein the second winding of the transformer is connected between the base of the transistor and the second supply conductor through a capacitor.

4. A control circuit as claimed in claim 1, wherein the second winding of the transformer is arranged between the base of the transistor and the second supply conductor through a resistor.

5. A supply circuit for an electric discharge tube having a pair of electrodes comprising, a pair of input terminals for applying an AC supply voltage of a given frequency to the supply circuit, a ballast impedance, means connecting the ballast impedance in series with the discharge tube across said input terminals, a starter circuit for the discharge tube comprising, current rectifying means having input terminals connected to the ends of the tube electrodes remote from the AC input terminals and a pair of DC output terminals, a controlled semiconductor switching element connected to said pair of DC output terminals to provide a low impedance electrical connection across the tube electrodes via said semiconductor switching element, and means for alternately switching the semiconductor switching element on and off at a frequency substantially higher than the frequency of said AC supply voltage during the ignition procedure of the discharge tube, said switching means comprising a transformer having first and second windings, means connecting said first winding between the collector of the switching element and one of said DC output terminals and the second winding between the second DC output terminal and a second electrode of the semiconductor switching element, and means connecting a third electrode of the semiconductor switching element to one of said DC output terminals.

6. A supply circuit as claimed in claim 5 wherein the switching element comprises a transistor and the second transformer winding is connected between the emitter of the transistor and the second DC output terminal and the windings are wound to provide regenerative feedback to cause the transistor to operate as an oscillator circuit.

7. A supply circuit as claimed in claim 5 wherein the switching element comprises a transistor and the second transformer winding is connected between the base of the transistor and the second DC output terminal via a capacitor and the windings are wound to provide regenerative feedback to cause the transistor to operate as an oscillator circuit.

8. A supply circuit as claimed in claim 5 wherein the switching element comprises a transistor and the second transformer winding is connected between the base of the transistor and the second DC output terminal via a resistor and the windings are wound to provide regenerative feedback to cause the transistor to operate as an oscillator circuit.

9. A supply circuit as claimed in claim 8 wherein said third electrode of the transistor is its emitter electrode which is connected directly to the second DC output terminal, and further comprising a second resistor connected between the base of the transistor and said one DC output terminal.

10. A supply circuit as claimed in claim 5 wherein the windings are wound to provide regenerative feedback to cause the switching element to operate as a high frequency oscillator circuit during each half cycle of the AC supply voltage and the DC voltage at said DC output terminals is determined by the voltage across the discharge tube, said supply circuit further comprising means coupled to the DC output terminals and to a control electrode of the semiconductor switching element and responsive to the DC voltage for biasing the switching element into cut-off upon ignition of the discharge tube.

11. A supply circuit as claimed in claim 5 wherein the switching element comprises a transistor, said supply circuit further comprising a negative temperature coefficient resistor connected between the base of the transistor and the second DC output terminal.

* * * * *